H. J. SWEET.
MAGNETIC CHUCK.
APPLICATION FILED JULY 22, 1920.
1,360,054.
Patented Nov. 23, 1920.
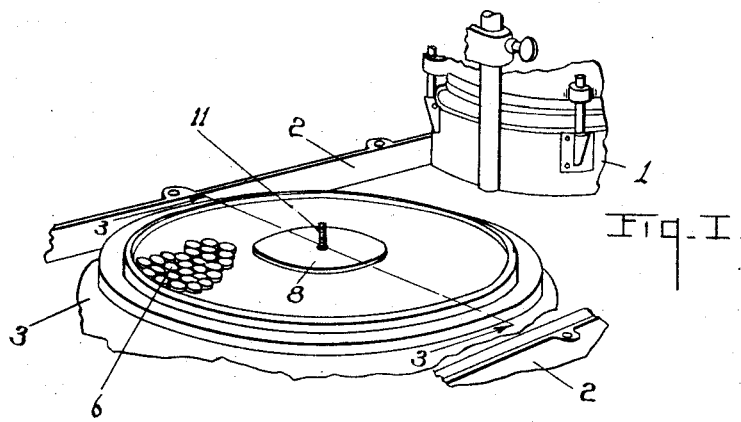
Fig. I.
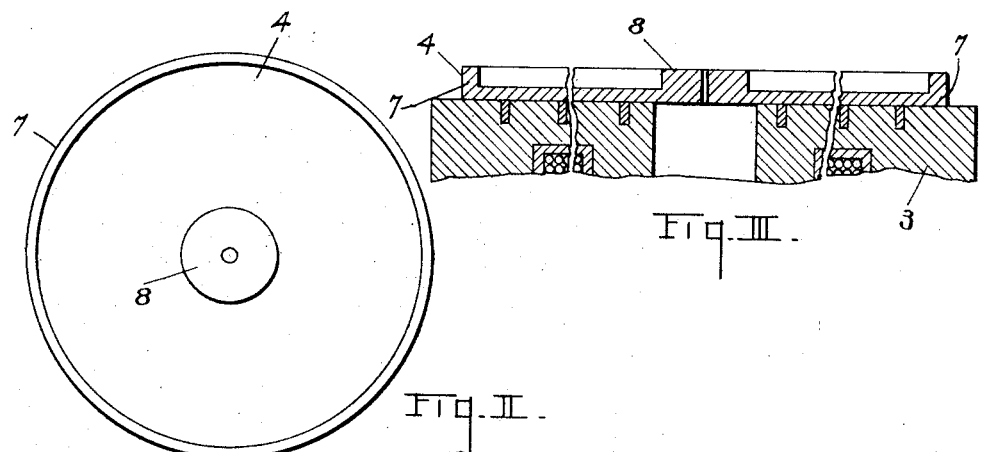
Fig. II.
Fig. III.
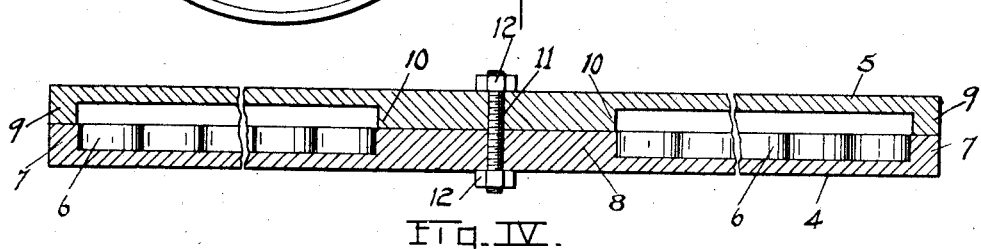
Fig. IV.
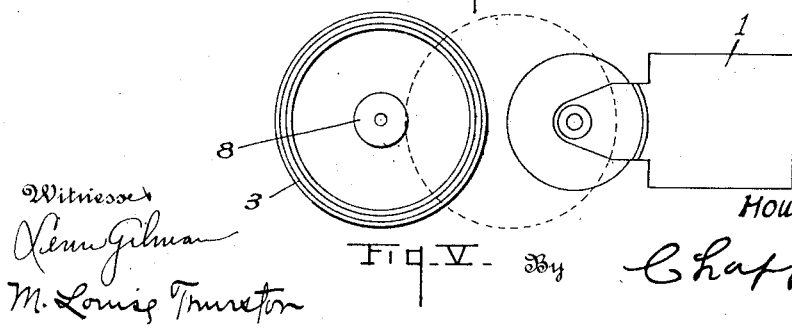
Fig. V.
Witnesses
Kenn Gilman
M. Louise Thurston
Inventor
Howard J. Sweet
By Chappell Earl
Attorney

UNITED STATES PATENT OFFICE.

HOWARD J. SWEET, OF LANSING, MICHIGAN, ASSIGNOR OF ONE-HALF TO RUSSELL N. PORTER, OF LANSING, MICHIGAN.

MAGNETIC CHUCK.

1,360,054.   Specification of Letters Patent.   Patented Nov. 23, 1920.

Application filed July 22, 1920. Serial No. 398,242.

*To all whom it may concern:*

Be it known that I, HOWARD J. SWEET, a citizen of the United States, residing at Lansing, county of Ingham, State of Michigan, have invented certain new and useful Improvements in Magnetic Chucks, of which the following is a specification.

This invention relates to improvements in magnetic chucks.

In the grinding and finishing of small parts there is a large amount of time consumed in arranging the parts in and removing them from the chucks or holders and this is the case even where magnetic chucks are employed, the latter permitting the effective simultaneous grinding of a large number of parts.

It is the main object of my invention to provide a work holder or attachment for use in connection with magnetic chucks which greatly facilitates and speeds up the work particularly where the parts are to be ground or finished on both sides as is frequently required.

A further object is to provide a work holder having these advantages which is adapted for use on magnetic chucks now in use without modifying or changing the same so that the work may be arranged on such chucks in the manner in which they were originally designed to be used or my improved work holder employed, as desired.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail perspective view of a grinding machine embodying the features of my invention, only such portions of the machine being illustrated as are deemed necessary to show an adaptation of my improvements.

Fig. II is a plan or face view of one of the work holder members.

Fig. III is a detail vertical section through the chuck with one of the work holder members arranged thereon, on a line corresponding to line 3—3 of Fig. I.

Fig. IV is a vertical central section through a pair of the work holder members disposed face to face preparatory to transferring from one holder member to the other.

Fig. V is a detail plan view in which the grinding machine is shown conventionally, the chuck being shown in full lines in its retracted or work receiving position and by dotted lines in grinding position.

Referring to the drawing, 1 represents a grinding machine, 2 parts of the frame thereof, and 3 a magnetic chuck. This chuck is provided with energizing coils and has brass rings set in grooves in the face. The structural details, however, of the chuck body form no part of my invention, that illustrated being one now upon the market.

In practice, the work is laid upon the face of this chuck body and retained thereon for the grinding operations by the aid of rings or stops or other supporting and work holding means, it being understood that the magnetism is not ordinarily sufficient to fully support the work against lateral movement as the magnetism holds the work down but does not hold it against sidewise movement except by the friction between the work and the chuck face. The result is that much time is consumed in arranging work upon and removing it from the chuck.

To facilitate this operation, I provide a pair of plate-like work holder members 4 and 5 adapted to be arranged on the face of the chuck 3 as shown in Fig. I and Fig. III with the work 6 disposed thereon, the work illustrated being small rollers or disks. These work holders are substantial duplicates except that the flange 7 and the center 8 of the plate 4 are slightly wider than the flange 9 and the center 10 of the plate or work holder member 5.

Each of these members 4 and 5 are adapted to be arranged on the chuck with the work thereon so that the work is subject to the magnetism or magnetic action of the chuck the same as though the work were arranged directly upon the face of the chuck.

In operation, the work may be arranged on the member 4 on a table or bench at any convenient location and placed upon the chuck. After one side of the work is ground, the work holder member 5 is arranged upon the work holder member 4, the bolt 11 inserted, and the nuts 12 tightened to clamp the members together. The superimposed members are then inverted and the work falls into the work receiving recess of the member 5. The upper nut 12 is then removed and the holder member 4 lifted from the member 5. This avoids the necessity of turning the work one piece at a time which requires a great deal of time, particularly where small pieces are being ground—sometimes as many as two or three hundred which, it will be appreciated, require a great deal of time to rearrange. The recess in the member 5 is slightly larger than that of the member 4 so that the work falls freely into the recess of the member 5 when the members are inverted.

By the aid of my improvements, the work of arranging and transferring can be accomplished very quickly and easily. Further, the work holders can be quickly and easily cleaned, extra work holders being provided so that they may be loaded during the grinding operation whereas, when work is placed directly upon the chuck, the grinder is idle during this period. Further, it is necessary that the surface on which the work is arranged should be perfectly clean, otherwise, the work is not uniform and perfectly ground, and as stated, the work holders may be easily cleaned.

I have illustrated and described my improvements in an embodiment which I have found very satisfactory. I have not attempted to illustrate or describe other modifications which I contemplate as I believe the disclosure made will enable those skilled in the art to which my invention relates to embody or adapt the same as may be desired.

Having thus described my invention, what I claim as new and desire to secure by Letters Patent is:

1. The combination with a magnetic chuck, of work holder members each having an annular work receiving recess in its face and each adapted to receive work and to be arranged on said chuck so that the work is subject to the magnetic action thereof, said members being adapted to be disposed face to face and the superimposed members inverted to transfer the work from one to the other, and a clamping bolt for said members disposed centrally thereof and having a nut on both ends.

2. The combination with a magnetic chuck and work holder members each having an annular work receiving recess in its face and each adapted to receive work and to be arranged on said chuck so that the work is subject to the magnetic action thereof, said members being adapted to be disposed face to face and the superimposed members inverted to transfer the work from one to the other.

3. The combination with a magnetic chuck and work holder members each having an annular work receiving recess in its face and each adapted to receive work and to be arranged on said chuck so that the work is subject to the magnetic action thereof, said members being adapted to be disposed face to face and the superimposed members inverted to transfer the work from one to the other, the work receiving recess of one being larger than that of the other so that the work will drop freely from the smaller to the larger recess.

4. The combination with a magnetic chuck, of work holder members each adapted to receive work and to be arranged on said chuck so that the work thereon is subject to the magnetic action of the chuck, said holder members having work receiving recesses in their faces and being adapted to be disposed face to face so that one member may be disposed upon the other with the work thereon and the superimposed members inverted to transfer the work from one to the other, and means for clamping said members together permitting the removal of the top member.

5. The combination with a magnetic chuck and work holder members each adapted to receive work and to be arranged on said chuck so that the work thereon is subject to the magnetic action of the chuck, said holder members having work receiving recesses in their faces and being adapted to be disposed face to face so that one member may be disposed upon the other with the work thereon and the superimposed members inverted to transfer the work from one to the other.

6. The combination with a magnetic chuck, of work holder members each adapted to receive work and to be arranged on said chuck so that the work thereon is subject to the magnetic action of the chuck, said holder members being adapted to be disposed face to face so that one member may be disposed upon the other with the work thereon and the superimposed members inverted to transfer the work from one to the other, and means for clamping said members together permitting the removal of the top member.

7. The combination with a magnetic chuck and work holder members each adapted to receive work and to be arranged on said chuck so that the work thereon is subject to the magnetic action of the chuck, said holder members being adapted to be disposed face to face so that one member may be disposed upon the other with the work thereon and the superimposed members inverted to transfer the work from one to the other.

In witness whereof, I have hereunto set my hand and seal in the presence of two witnesses.

HOWARD J. SWEET. [L. S.]

Witnesses:
F. S. PORTER,
E. H. PORTER.